(12) United States Patent
Koyama et al.

(10) Patent No.: US 10,515,547 B2
(45) Date of Patent: Dec. 24, 2019

(54) SIGN RECOGNITION AND DISPLAY DEVICE

(71) Applicant: MAZDA MOTOR CORPORATION, Hiroshima (JP)

(72) Inventors: Kanichi Koyama, Aki-gun (JP); Tetsuhiro Yamashita, Aki-gun (JP); Takashi Goto, HigashiHiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 53 days.

(21) Appl. No.: 15/753,789

(22) PCT Filed: Aug. 9, 2016

(86) PCT No.: PCT/JP2016/003673
§ 371 (c)(1),
(2) Date: Feb. 20, 2018

(87) PCT Pub. No.: WO2017/033424
PCT Pub. Date: Mar. 2, 2017

(65) Prior Publication Data
US 2018/0247532 A1    Aug. 30, 2018

(30) Foreign Application Priority Data

Aug. 25, 2015   (JP) .................... 2015-166080

(51) Int. Cl.
*H04N 7/00*    (2011.01)
*G08G 1/0962*    (2006.01)
(Continued)

(52) U.S. Cl.
CPC .......... *G08G 1/09623* (2013.01); *B60R 1/00* (2013.01); *G06K 9/00818* (2013.01); *B60R 2300/80* (2013.01)

(58) Field of Classification Search
CPC .......... G06K 9/00818; G08G 1/09623; G08G 1/0967
See application file for complete search history.

(56) References Cited

U.S. PATENT DOCUMENTS

| | | | |
|---|---|---|---|
| 2012/0150428 A1* | 6/2012 | Niem | G08G 1/096716 701/409 |
| 2016/0137127 A1* | 5/2016 | Yokochi | G06K 9/00798 348/148 |

FOREIGN PATENT DOCUMENTS

| | | |
|---|---|---|
| JP | 2005-128790 A | 5/2005 |
| JP | 2007-183764 A | 7/2007 |

(Continued)

OTHER PUBLICATIONS

International Search Report issued in PCT/JP2016/003673; dated Nov. 15, 2016.

*Primary Examiner* — Sath V Perungavoor
*Assistant Examiner* — Peet Dhillon
(74) *Attorney, Agent, or Firm* — Studebaker & Brackett PC

(57) ABSTRACT

A sign recognition and display device (1) includes: a camera (2); a sign recognition unit (10) configured to recognize a road sign included in an image taken with the camera; a speed limit information obtaining unit (12) configured to repeatedly obtain speed limit information; and a display control unit (14) configured to, if a speed limit sign is recognized, and the speed limit information is obtained, show, on a display device (8), information on a speed limit indicated by the speed limit sign. If, while information on the speed limit indicated by the speed limit sign is displayed, the speed limit information is obtained, and the speed limit determined by the obtained speed limit information is different from the speed limit determined by the previously obtained speed limit information, the display control unit (Continued)

shows information on the speed limit determined by the presently obtained speed limit information.

3 Claims, 3 Drawing Sheets

(51) Int. Cl.
    *G06K 9/00*     (2006.01)
    *B60R 1/00*     (2006.01)

(56) References Cited

FOREIGN PATENT DOCUMENTS

| | | |
|---|---|---|
| JP | 2012-185076 A | 9/2012 |
| JP | 2015-102898 A | 6/2015 |

\* cited by examiner

SIGN RECOGNITION AND DISPLAY DEVICE

TECHNICAL FIELD

The present invention relates to a sign recognition and display device, and more particularly relates to a sign recognition and display device that recognizes a road sign present in front of a subject vehicle and displays information on the road sign.

BACKGROUND ART

A suggestion has been made to take an image of an area in front of a vehicle with a camera and obtain, based on the taken image, information required to support vehicle operation.

For example, Patent Document 1 discloses an on-board device that extracts information on road signs and other elements from an image taken with an on-board camera and displays the extracted information on a display device. Even in a situation where road sign information stored in a car navigation information storage means includes sign information corresponding to subject vehicle position information obtained by a GPS or any other system, if an appropriate road sign is extracted from the image obtained by the imager, the on-board device displays the extracted road sign on the display device.

CITATION LIST

Patent Documents

[Patent Document 1] Japanese Unexamined Patent Publication No. 2007-183764

SUMMARY

Technical Problem

However, if, while such a known on-board device as described above shows a road sign indicating a speed limit on a display device, a subject vehicle enters a road with a different speed limit (e.g., from an ordinary road into an expressway, or from a suburban highway into an urban road), and the on-board device cannot recognize a sign indicating the speed limit for the entered road, a different speed limit from the actual speed limit may continue to be displayed.

The present invention has been made to solve the conventional problems. It is therefore an object of the present invention to provide a sign recognition and display device that can display a proper speed limit even when a subject vehicle enters a road with a different speed limit and a sign indicating the speed limit for the entered road is not recognized.

Solution to the Problem

To achieve the object, a sign recognition and display device according to the present invention is directed to a sign recognition and display device that recognizes a road sign present in front of a subject vehicle and displays information on the road sign. The device includes: a camera configured to take an image of an area in front of the subject vehicle; a processor configured to recognize a road sign included in the image taken by the camera; and repeatedly obtain speed limit information for determining a speed limit at a present position of the subject vehicle; and a display configured to, if the processor recognizes the road sign indicating the speed limit and obtains the speed limit information at the present position of the subject vehicle, display information on the speed limit indicated by the road sign recognized.

If, while the display displays information on the speed limit indicated by the road sign recognized, the processor obtains the speed limit information, and the speed limit determined by the speed limit information obtained is different from the speed limit determined by speed limit information that was previously obtained by the processor, the display changes information to be displayed to information on the speed limit determined by the speed limit information that is presently obtained by the processor. In addition, if, while the display displays information on the speed limit indicated by the road sign recognized, the processor obtains the speed limit information, and the speed limit determined by the speed limit information obtained is identical to the speed limit determined by the speed limit information that was previously obtained by the processor, the display continues to display the information on the speed limit indicated by the road sign recognized.

According to such a configuration for the present invention, if the road sign indicating the speed limit is recognized, and the speed limit information is obtained, the display shows, on a display device, information on the speed limit indicated by the road sign, and while the information on the speed limit indicated by the road sign is displayed, the speed limit determined by the speed limit information that is presently obtained by the processor is different from the speed limit determined by the previously obtained speed limit information, information to be displayed is changed from information on the speed limit indicated by the road sign to the information on the speed limit determined by the speed limit information that is presently obtained by the processor. Thus, if, while information on the speed limit based on the actual road sign is preferentially displayed, the entry of the subject vehicle into a road with a different speed limit triggers a change in the speed limit determined by the speed limit information, information on the speed limit that has undergone such a change can be reliably displayed. This allows information on a proper speed limit to be displayed based on the speed limit information even in a situation where when the subject vehicle enters the road with the different speed limit, a sign indicating the speed limit for the entered road is not recognized.

In addition, according to such a configuration for the present invention, if, while the information on the speed limit indicated by the recognized road sign is displayed, the speed limit determined by the speed limit information that is presently obtained by the processor is identical to the speed limit determined by the previously obtained speed limit information, the display continues to show the information on the speed limit indicated by the recognized road sign. Thus, if there are no changes to the speed limit determined by the speed limit information, the information on the speed limit indicated by the recognized road sign can continue to be displayed. This allows the information on the speed limit based on the actual road sign to be displayed.

In another preferred embodiment of the present invention, if, while the display displays the information on the speed limit indicated by the road sign recognized, the speed limit information obtaining unit cannot obtain the speed limit information, the display continues to display the information on the speed limit indicated by the road sign recognized.

According to such a configuration for the present invention, for example, even if no speed limit information for the road on which the subject vehicle is travelling is set, and as a result, while the information on the speed limit indicated by the recognized road sign is displayed, the speed limit information cannot be obtained, information on the speed limit can be displayed based on the actual road sign.

In still another preferred embodiment of the present invention, if the sign recognition unit does not recognize the road sign indicating the speed limit, and the speed limit information obtaining unit obtains the speed limit information at the present position of the subject vehicle, the display displays information on the speed limit determined by the speed limit information obtained.

According to such a configuration for the present invention, information on the speed limit can be displayed based on the speed limit information even in a situation where, for example, the presence of an obstacle, such as another vehicle, has prevented a sign indicating a speed limit for a road on which the subject vehicle is travelling from being recognized.

Advantages of the Invention

A sign recognition and display device according to the present invention can display a proper speed limit even when a subject vehicle enters a road with a different speed limit and a sign indicating the speed limit for the entered road is not recognized.

DESCRIPTION OF EMBODIMENTS

A sign recognition and display device according to an embodiment of the present invention will now be described with reference to the attached drawings.

First, a configuration for the sign recognition and display device according to the embodiment of the present invention will be described with reference to FIG. 1.

Figure 1:
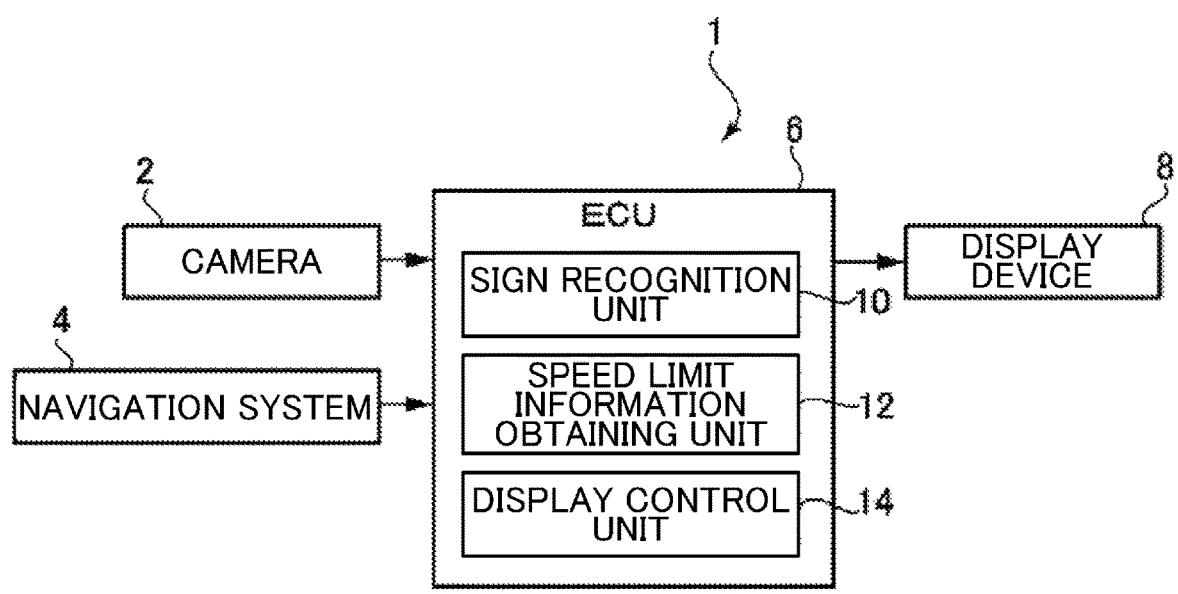
FIG. 1 is a block diagram showing electrical components of a sign recognition and display device according to an embodiment of the present invention.

FIG. 1 is a block diagram showing electrical components of the sign recognition and display device according to the embodiment of the present invention.

In FIG. 1, the reference numeral 1 denotes the sign recognition and display device according to the embodiment of the present invention. The sign recognition and display device 1 includes a camera 2 used to take an image of an area in front of a subject vehicle, and a navigation system 4. Image data taken with the camera 2 or information obtained by the navigation system 4 is input to an electronic control unit (ECU) 6. The sign recognition and display device 1 further includes a display device 8 that displays various pieces of information output from the ECU 6.

The camera 2 is installed in the vehicle to face toward the front of the vehicle including the sign recognition and display device 1, takes an image, and outputs the taken image data to the ECU 6. Examples of the camera 2 include a camera including a CMOS image sensor or a CCD image sensor as an imaging device.

The navigation system 4 uses a global positioning system (GPS) or any other system to determine the present position of the subject vehicle, and provides various pieces of information on the present position. In particular, in this embodiment, the navigation system 4 offers, to the ECU 6, speed limit information for determining the speed limit at the present position of the subject vehicle.

The display device 8 is disposed within a driver's field of view in a front portion of a passenger compartment. Examples of the display device 8 include a liquid crystal display, and a head-up display.

The ECU 6 includes a sign recognition unit 10, a speed limit information obtaining unit 12, and a display control unit 14. The sign recognition unit 10 recognizes a road sign included in an image taken with the camera 2. The speed limit information obtaining unit 12 obtains the speed limit information for determining the speed limit at the present position of the subject vehicle. The display control unit 14 shows information on speed limits on the display device 8.

These elements of the ECU 6 are each configured as a computer including a central processing unit (CPU), various programs interpreted and executed by the CPU (including a basic control program, such as an operating system (OS), and an application launched by the OS to achieve a specific function), and an internal memory, such as a read-only memory (ROM) or a random access memory (RAM), for storing programs and various data.

Next, a process performed by the sign recognition and display device 1 will be described with reference to FIGS. 2 and 3.

Figure 2:
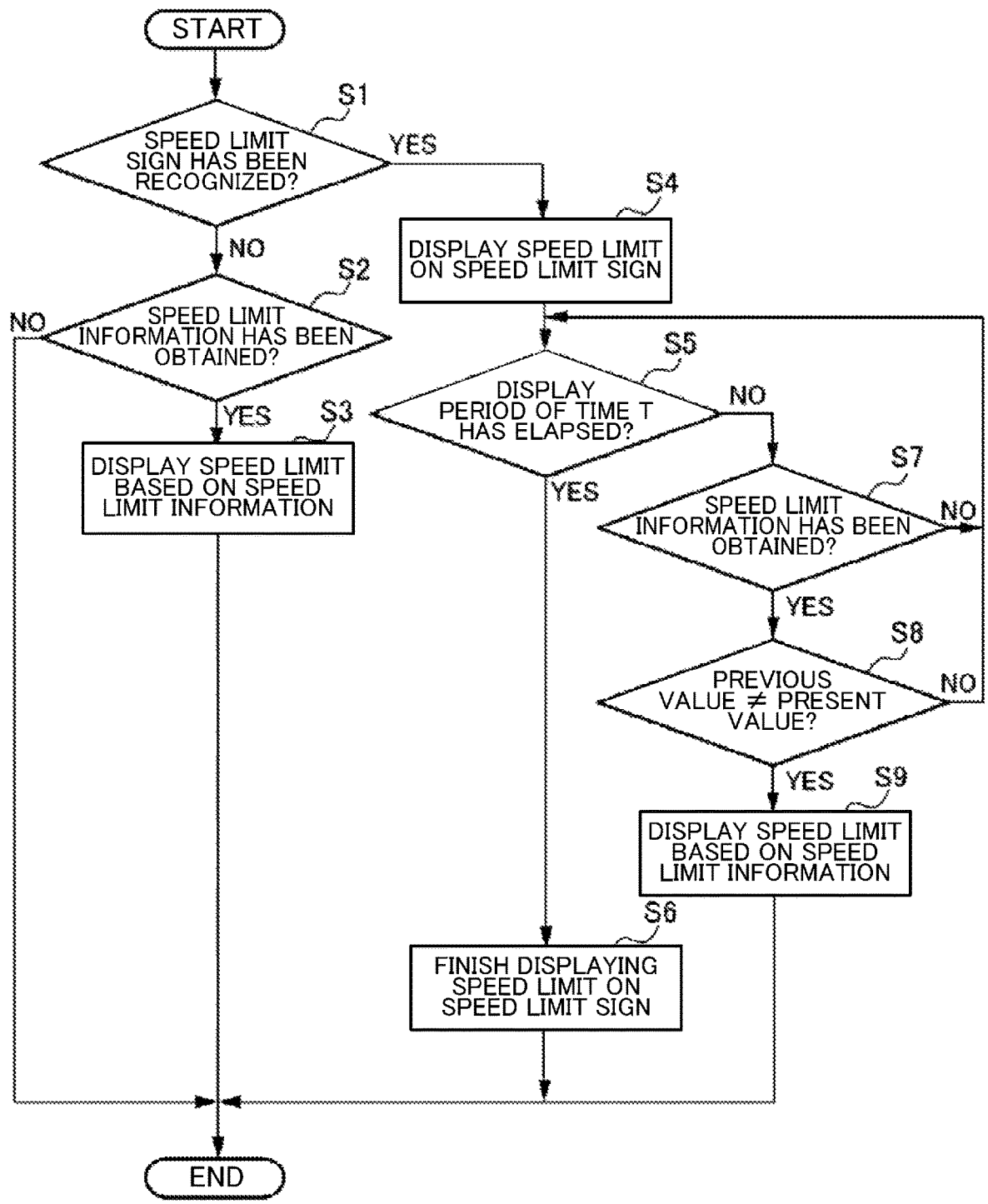
FIG. 2 is a flowchart of a speed limit display process in which the sign recognition and display device according to the embodiment of the present invention displays information on speed limits.

FIG. 2 is a flowchart of a speed limit display process in which the sign recognition and display device 1 according to the embodiment of the present invention displays information on speed limits. FIG. 3 is a conceptual diagram exemplifying how the sign recognition and display device 1 according to the embodiment of the present invention displays information on speed limits.

If an ignition of the vehicle is turned on, and the power of the sign recognition and display device 1 is turned on, the speed limit display process is started and repeatedly performed.

In parallel with the speed limit display process, a process in which the sign recognition unit 10 recognizes a road sign and a process in which the speed limit information obtaining unit 12 receives road information are repeated. Meanwhile, the sign recognition unit 10 recognizes the presence or absence of a road sign and what the road sign indicates, based on the outline and coloration of the subject, and the presence or absence of characters, included in the image data taken with the camera 2. The speed limit information obtaining unit 12 receives road information including speed limit information from the navigation system 4. If speed limit information at the present position of the subject vehicle is not determined, the navigation system 4 outputs, to the ECU 6, road information that includes information indicating that no speed limit information is determined.

As shown in FIG. 2, upon the start of the speed limit display process, the display control unit 14 determines, in step S1, whether or not the sign recognition unit 10 has recognized a road sign indicating the speed limit (hereinafter referred to as the "speed limit sign").

If the sign recognition unit 10 has not recognized the speed limit sign, the process proceeds to step S2. In step S2, the display control unit 14 determines whether or not the speed limit information obtaining unit 12 has obtained the speed limit information from the navigation system 4 (i.e., whether or not the road information received from the navigation system 4 by the speed limit information obtaining unit 12 includes the speed limit information).

If the speed limit information obtaining unit 12 has not obtained the speed limit information from the navigation system 4, the sign recognition and display device 1 terminates the speed limit display process.

On the other hand, if the speed limit information obtaining unit 12 has obtained the speed limit information from the navigation system 4, the process proceeds to step S3. In step S3, the display control unit 14 shows, on the display device 8, the speed limit determined by the speed limit information that has been obtained from the navigation system 4 by the speed limit information obtaining unit 12. Then, the sign recognition and display device 1 terminates the speed limit display process while the display device 8 keeps displaying the speed limit.

Figure 3:
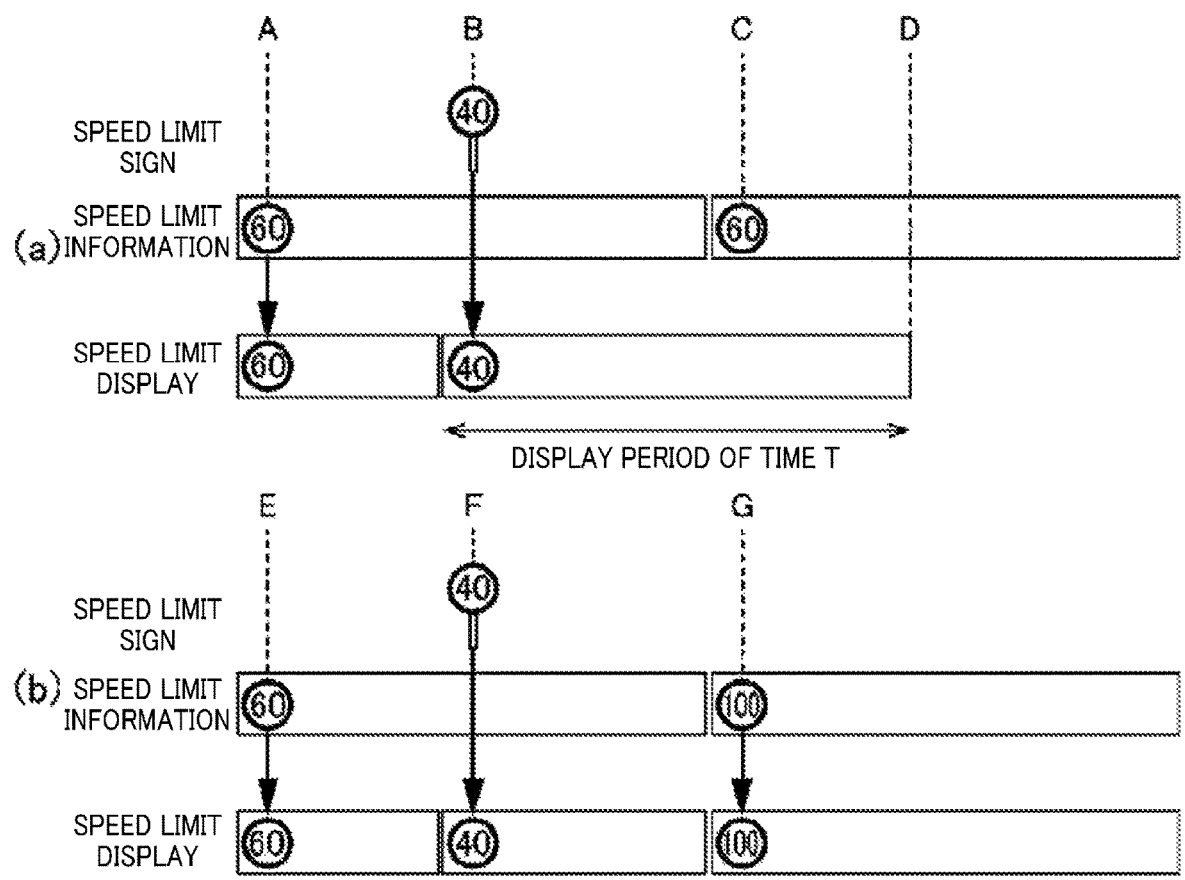
FIG. 3 is a conceptual diagram exemplifying how the sign recognition and display device according to the embodiment of the present invention displays information on speed limits.

For example, if, just like the point in time A shown in a portion (a) of FIG. 3 or the point in time E shown in a portion (b) of FIG. 3, the sign recognition unit 10 has not recognized a speed limit sign, and the speed limit determined by the speed limit information that has been obtained from the navigation system 4 by the speed limit information obtaining unit 12 is 60 km/h, the display control unit 14 shows a speed limit of 60 km/h on the display device 8.

If, in step S1, the sign recognition unit 10 has recognized a speed limit sign, the process proceeds to step S4. In step S4, the display control unit 14 shows, on the display device 8, the speed limit indicated by the speed limit sign that has been recognized by the sign recognition unit 10. At this time, if the display control unit 14 shows, on the display device 8, the speed limit determined by the speed limit information that has been obtained from the navigation system 4 by the speed limit information obtaining unit 12, the display control unit 14 preferentially shows, on the display device 8, the speed limit indicated by the speed limit sign that has been recognized by the sign recognition unit 10.

For example, if, just like the point in time B shown in the portion (a) of FIG. 3 or the point in time F shown in the portion (b) of FIG. 3, while the display control unit 14 shows, on the display device 8, a speed limit of 60 km/h determined by the speed limit information which has been obtained from the navigation system 4 by the speed limit information obtaining unit 12, the sign recognition unit 10 recognizes a road sign indicating a speed limit of 40 km/h, the display control unit 14 preferentially shows, on the display device 8, the speed limit indicated by the road sign, i.e., 40 km/h.

Next, in step S5, the display control unit 14 determines whether or not a predetermined display period of time T (e.g., 30 seconds) has elapsed since the display device 8 started displaying the speed limit indicated by the speed limit sign.

If the display period of time T has elapsed, the process proceeds to step S6. In step S6, the display control unit 14 finishes showing the speed limit on the display device 8, and terminates the speed limit display process.

For example, the display control unit 14 finishes displaying the speed limit shown on the display device 8, i.e., 40 km/h, at the point in time D when the display period of time T has elapsed since the display control unit 14 started showing, on the display device 8, the speed limit indicated by the road sign at the point in time B shown in the portion (a) of FIG. 3, i.e., 40 km/h.

On the other hand, if the display period of time T has not elapsed since the display device 8 started displaying the speed limit indicated by the speed limit sign, the process proceeds to step S7. In step S7, the display control unit 14 determines whether or not the speed limit information obtaining unit 12 has obtained the speed limit information from the navigation system 4.

If the speed limit information obtaining unit 12 has obtained the speed limit information from the navigation system 4, the process proceeds to step S8. In step S8, the display control unit 14 determines whether or not the speed limit determined by the speed limit information is different from the speed limit determined by the speed limit information that was previously obtained by the speed limit information obtaining unit 12.

If the speed limit determined by the speed limit information presently obtained by the speed limit information obtaining unit 12 is different from the speed limit determined by the previously obtained speed limit information, the process proceeds to step S9. In step S9, the display control unit 14 changes the information shown on the display device 8 to the speed limit determined by the speed limit information presently obtained by the speed limit information obtaining unit 12. Then, the sign recognition and display device 1 terminates the speed limit display process while the display device 8 keeps displaying the speed limit.

For example, if the speed limit information obtaining unit 12 obtains the speed limit information indicating a speed limit of 100 km/h from the navigation system 4 at the point in time G when the display period of time T has not elapsed in the portion (b) of FIG. 3, this speed limit, i.e., 100 km/h, is different from the speed limit determined by the speed limit information that was previously obtained by the speed limit information obtaining unit 12, i.e., 60 km/h. Thus, the display control unit 14 changes information to be displayed on the display device 8 from the speed limit indicated by the road sign, i.e., 40 km/h, to the speed limit determined by the speed limit information presently obtained by the speed limit information obtaining unit 12, i.e., 100 km/h.

If, as described above, the speed limit determined by the speed limit information presently obtained by the speed limit information obtaining unit 12 is different from the speed limit determined by the speed limit information previously obtained, changing the information shown on the display device 8 from the speed limit indicated by the recognized road sign to the speed limit determined by the speed limit information presently obtained allows a proper speed limit to be displayed based on the speed limit information even in a situation where when a subject vehicle enters a road with a different speed limit, a sign indicating the speed limit for the entered road is not recognized.

On the other hand, if, in step S7, the speed limit information obtaining unit 12 has not obtained the speed limit information from the navigation system 4, or if, in step S9, the speed limit determined by the speed limit information that is presently obtained by the speed limit information obtaining unit 12 is identical to the speed limit determined by the previously obtained speed limit information, the display control unit 14 continues to show the speed limit indicated by the road sign. From then on, steps S5 to S8 are repeated until the display period of time T elapses in step S5 or until a determination is made in step S8 that the speed limit determined by the speed limit information that is presently obtained by the speed limit information obtaining unit 12 is different from the speed limit determined by the previously obtained speed limit information.

For example, if the speed limit information obtaining unit 12 obtains speed limit information indicating a speed limit of 60 km/h from the navigation system 4 at the point in time C when the display period of time T has not elapsed in the portion (a) of FIG. 3, this speed limit, i.e., 60 km/h, is identical to the speed limit determined by the speed limit information that was previously obtained by the speed limit information obtaining unit 12, i.e., 60 km/h. Thus, the display control unit 14 continues to show the speed limit indicated by the road sign, i.e., 40 km/h.

Next, advantages of the sign recognition and display device 1 according to the foregoing embodiment of the present invention will be described.

First, if the sign recognition unit 10 recognizes a speed limit sign, and the speed limit information obtaining unit 12 obtains the speed limit information, the display control unit 14 shows, on the display device 8, information on the speed limit indicated by the speed limit sign, and while the display device 8 displays the information on the speed limit indicated by the recognized road sign, the speed limit information obtaining unit 12 obtains speed limit information. In this case, if the speed limit determined by the obtained speed limit information is different from the speed limit determined by the speed limit information that was previously obtained by the speed limit information obtaining unit 12, information to be displayed is changed to the information on the speed limit determined by the speed limit information that is presently obtained by the speed limit information obtaining unit 12. Thus, if, while information on the speed limit based on the actual road sign is preferentially displayed, the entry of a subject vehicle into a road with a different speed limit triggers a change in the speed limit determined by the speed limit information, information on the speed limit that has undergone such a change can be reliably displayed. This allows information on a proper speed limit to be displayed based on the speed limit information even in a situation where when the subject vehicle enters the road with the different speed limit, a sign indicating the speed limit for the entered road is not recognized.

In addition, if, while the display device 8 displays information on the speed limit indicated by the recognized road sign, the speed limit information obtaining unit 12 obtains the speed limit information, and the speed limit determined by the obtained speed limit information is identical to the speed limit determined by the speed limit information that was previously obtained by the speed limit information obtaining unit 12, the display control unit 14 continues to show information on the speed limit indicated by the recognized road sign. Thus, if there are no changes to the speed limit determined by the speed limit information, the information on the speed limit indicated by the recognized road sign can continue to be displayed. This allows the information on the speed limit based on the actual road sign to be displayed.

If, while the display device 8 displays information on the speed limit indicated by the recognized road sign, the speed limit information obtaining unit 12 cannot obtain the speed limit information, the display control unit 14 continue to show the information on the speed limit indicated by the recognized road sign. Thus, for example, even if no speed limit information for the road on which the subject vehicle is travelling is set, information on the speed limit can be displayed based on the actual road sign.

If the sign recognition unit 10 does not recognize any road sign indicating the speed limit, and the speed limit information obtaining unit 12 obtains speed limit information at the present position of the subject vehicle, the display control unit 14 shows information on the speed limit determined by the obtained speed limit information. This allows information on the speed limit to be displayed based on the speed limit information even in a situation where, for example, the presence of an obstacle, such as another vehicle, has prevented a speed limit sign from being recognized.

DESCRIPTION OF REFERENCE CHARACTERS

1 Sign Recognition And Display Device
2 Camera
4 Navigation System
6 ECU
8 Display Device
10 Sign Recognition Unit
12 Speed Limit Information Obtaining Unit
14 Display Control Unit

The invention claimed is:

1. A sign recognition and display device that recognizes a road sign present in front of a subject vehicle and displays information on the road sign, the device comprising:
a camera configured to take an image of an area in front of the subject vehicle;
a processor configured to:
recognize a road sign included in the image taken by the camera; and
repeatedly obtain speed limit information for determining a speed limit at a present position of the subject vehicle; and
a display configured to, if the processor recognizes the road sign indicating the speed limit and obtains the speed limit information at the present position of the subject vehicle, display information on the speed limit indicated by the road sign recognized, wherein
if, while the display displays information on the speed limit indicated by the road sign recognized, the processor obtains the speed limit information, and the speed limit determined by the speed limit information obtained is different from the speed limit determined by the speed limit information that was previously obtained by the processor, the display changes information to be displayed to information on the speed limit determined by the speed limit information that is presently obtained by the processor, and
if, while the display displays information on the speed limit indicated by the road sign recognized, the processor obtains the speed limit information, and the speed limit determined by the speed limit information obtained is identical to the speed limit determined by the speed limit information that was previously obtained by the processor, the display continues to display the information on the speed limit indicated by the road sign recognized.

2. The device of claim 1, wherein
if, while the display displays the information on the speed limit indicated by the road sign recognized, the processor cannot obtain the speed limit information, the display continues to display the information on the speed limit indicated by the road sign recognized.

3. The device of claim 1, wherein
if the processor does not recognize the road sign indicating the speed limit and obtains the speed limit information at the present position of the subject vehicle, the display displays information on the speed limit determined by the speed limit information obtained.

* * * * *